United States Patent [19]
Bitz et al.

[11] Patent Number: 5,323,389
[45] Date of Patent: Jun. 21, 1994

[54] ATM CELL INTERFACE AND METHOD FOR DISPATCHING AN ATM CELL

[75] Inventors: Francois J. Bitz; Onat Menzilcioglu; Eric C. Cooper; Robert D. Sansom, all of Pittsburgh, Pa.

[73] Assignee: Fore Systems, Inc., Warrendale, Pa.

[21] Appl. No.: 930,081

[22] Filed: Aug. 14, 1992

[51] Int. Cl.⁵ .............................................. H04L 12/56
[52] U.S. Cl. .................................. 370/60.1; 370/94.2
[58] Field of Search .................... 370/60, 60.1, 94.1, 370/94.2, 110.1

[56] References Cited

U.S. PATENT DOCUMENTS

| | | | |
|---|---|---|---|
| 5,067,123 | 11/1991 | Hyodo | 370/60 |
| 5,130,978 | 7/1992 | Mobasser | 370/60 |
| 5,185,743 | 2/1993 | Murayama et al. | 370/60 |

Primary Examiner—Wellington Chin
Attorney, Agent, or Firm—Ansel M. Schwartz

[57] ABSTRACT

An ATM cell interface for dispatching an ATM cell comprising N input ports, where N ≥ 1 and is an integer. A table lookup mechanism directs a cell from an input port to any desired destination. The table lookup mechanism has entries which identify desired destination for corresponding cells. The number of possible entries in the table lookup mechanism is less than a total number of entries supported by the ATM cell header. The table lookup mechanism preferably includes a first table which produces a first signal based on the value of the VPI field and a second level table which produces a second signal based on the value of the VCI field. The first and second signals are used to route the cell from an input port to a desired destination. A method for dispatching an ATM cell comprising the steps of locating a table entry in a first level table corresponding to a value of a VPI field of the cell. Then there is the step of producing a first signal corresponding to the table entry. Next, there is the step of locating a connection entry in a second level table corresponding to a value of a VCI field of the cell and the first signal. Then there is the step of producing a second signal corresponding to the connection entry. Next there is the step of directing a cell to a desired destination corresponding to the second signal.

27 Claims, 5 Drawing Sheets

ATM CELL INTERFACE AND METHOD FOR DISPATCHING AN ATM CELL

FIELD OF THE INVENTION

The present invention pertains to an ATM network and a method and apparatus for routing an ATM cell therethrough. More specifically, the present invention pertains to a method and apparatus for routing an ATM cell through an ATM network with the use of a two level table lookup.

BACKGROUND OF THE INVENTION

The telecommunications industry has developed a new international standard called Asynchronous Transfer Mode (ATM) that will be the basis of the forthcoming Broadband Integrated Services Digital Network (BISDN). The ATM standard allows transmission of intermixed audio, video, and data over high-speed links. As well as being used in wide-area networks, the ATM standard can be used for local-area networks to support multimedia applications.

The unit of transmission used in the ATM standard is a cell. An ATM cell contains 53 bytes of information and has the basic format shown in FIG. 1. The four-byte header field contains virtual path and virtual channel identifiers which are used for routing the cell through the ATM network. The HEC byte contains a CRC (cyclic redundancy check) value to check the correctness of the cell header and to allow correction of single-bit errors if desired.

The ATM header uniquely determines the parameters associated with a given connection. Within an end user interface such as a computer multiple connections can be going on at the same time; therefore, there is a need to dispatch these cells to their correct destination based on a given state of the connection, as established during call setup.

Within a switch each ATM cell is switched based on the information contained in its header; more specifically based on its Virtual Path Identifier (VPI) and its Virtual Channel Identifier (VCI) shown in FIG. 1. A combination of VCI and VPI bits are used to index lookup tables that contain the routing information.

In order to support all possible header entries at any network interface a very large table (i.e. 2^28 or about 64 million entries) would be required. However, in most cases, only a few VCI entries are defined for a given VPI and direct addressing is therefore quite wasteful of memory space. Coupled with the fact that a switch supports many input ports, each one with access to its own dedicated address space, there would be required unpractical large size memories to support every possible correction. Existing implementations typically require to 'bit-stip' (or ignore some of the bits in order to reduced the table size) some of the VCI or VPI fields in order to reduce table sizes. (T1S1 Technical Sub-Committee. Broadband Aspects of ISDN, Baseline Document, August 1990. Chief Editor: Rajeev Sinha, incorporated by reference).

SUMMARY OF THE INVENTION

The present invention pertains to an ATM cell interface for dispatching an ATM cell having a header. The interface is comprised of L input ports, where $L \leq 1$ and is an integer. The cell is also comprised of a table lookup mechanism that directs a cell from an input port to any desired destination. The table lookup mechanism has entries which identify desired destination for corresponding cells. The number of possible entries in the table lookup mechanism is less than a total number of entries supported by the ATM cell header. Preferably, a cell includes a VCI field having a value and a VPI field having a value. The table lookup mechanism preferably includes a first table which produces a first signal based on the value of the VPI field and a second level table which produces a second signal based on the value of the VCI field. The first and second signals are used to route the cell from an input port to a desired destination.

The present invention also pertains to a method for dispatching an ATM cell. The method comprises the steps of locating a table entry in a first level table corresponding to a value of a VPI field of the cell. Then there is the step of producing a first signal corresponding to the table entry. Next, there is the step of locating a connection entry in a second level table corresponding to a value of a VCI field of the cell and the first signal. Then there is the step of producing a second signal corresponding to the connection entry. Next there is the step of directing a cell to a desired destination corresponding to the second signal. Preferably, the step of producing the first signal include the step of producing the first signal corresponding to a value of a INDEX field of the table entry. Preferably, the step of producing the second signal includes the step of producing the second signal corresponding to a value of a CONNECTION INFORMATION field of the connection entry.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 2:
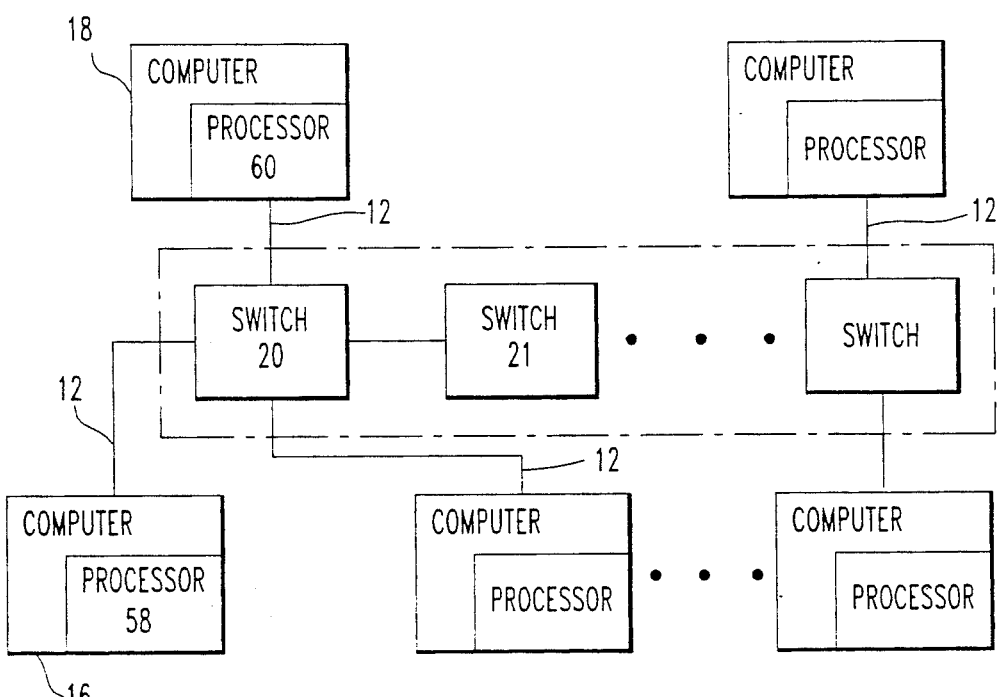
FIG. 2 is a schematic representation of an ATM communication network.
Figure 6:
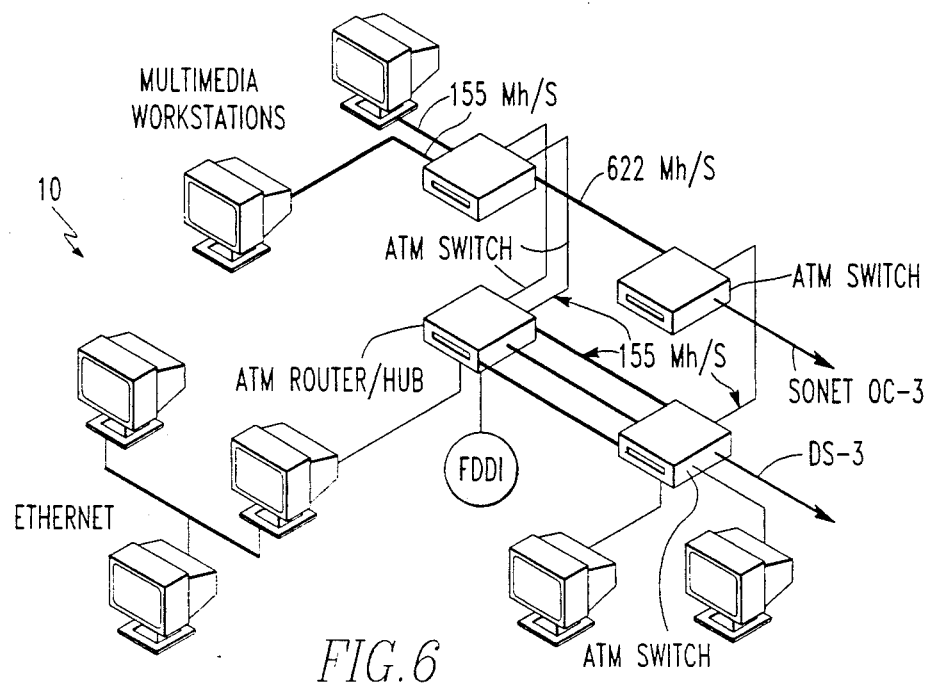
FIG. 6 is a schematic representation of an ATM communication involving a LAN.

Referring now to the drawings wherein like reference numerals refer to similar or identical parts throughout the several views, and more specifically to FIG. 2 thereof, there is shown a schematic representation of a communication network 10. The communication network 10 is comprised of an ATM network portion 12. There is also an ATM cell interface 14 in communication with the network portion 12. The network 10 is also comprised of a first general purpose computer 16 and at least a second general purpose computer 18 in communication with each other over the ATM network portion 12 through the ATM switch portion 14. The first computer 16 and second computer 18 each execute instructions for applications other than communications between computers. As shown in FIG. 6, the network 10 can include an Ethernet, FDDI, DS-3, or Sonet OC-3 to name but a few of the many possible additional elements of the network 10.

Figure 3:
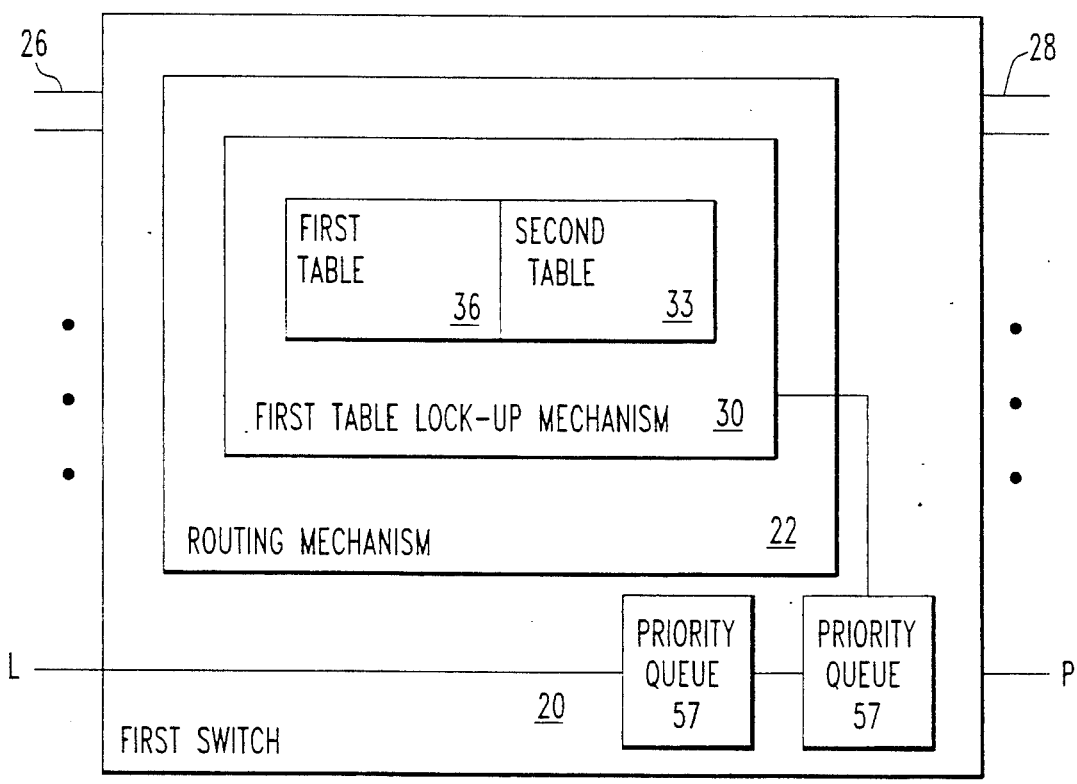
FIG. 3 is a schematic representation of a switch of the present invention.

The cell interface 14 includes a first switch 20, as shown in FIG. 3, having a first routing mechanism 22 for routing an ATM cell 24 between at least the first computer 16 and the second computer 18. The first switch 20 has L input ports 26, where L≦1 and is an integer and P output ports 28, where P≦1 and is an integer and through which ATM cells 24 enter and exit the first switch 20, respectively. Additionally, the first routing mechanism 22 preferably includes a first table lookup mechanism 30 that determines which output port 28 is to receive a cell 24 from an input port 26 such that the cell 24 is directed to a desired output port 28 which is in communication with the second computer 18.

Figure 4:
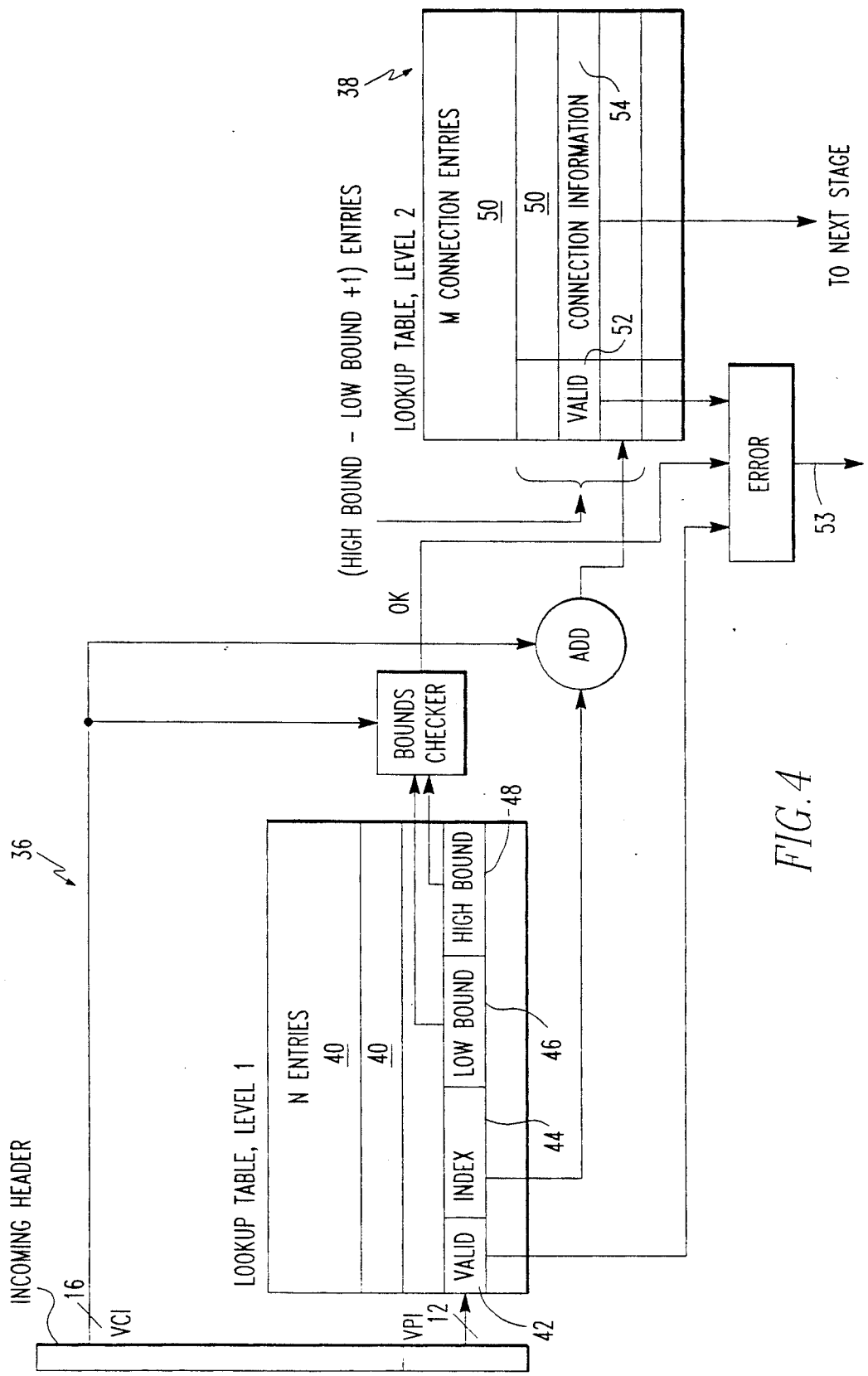
FIG. 4 is a schematic representation of a first table and a second level table of the present invention.
Figure 5:
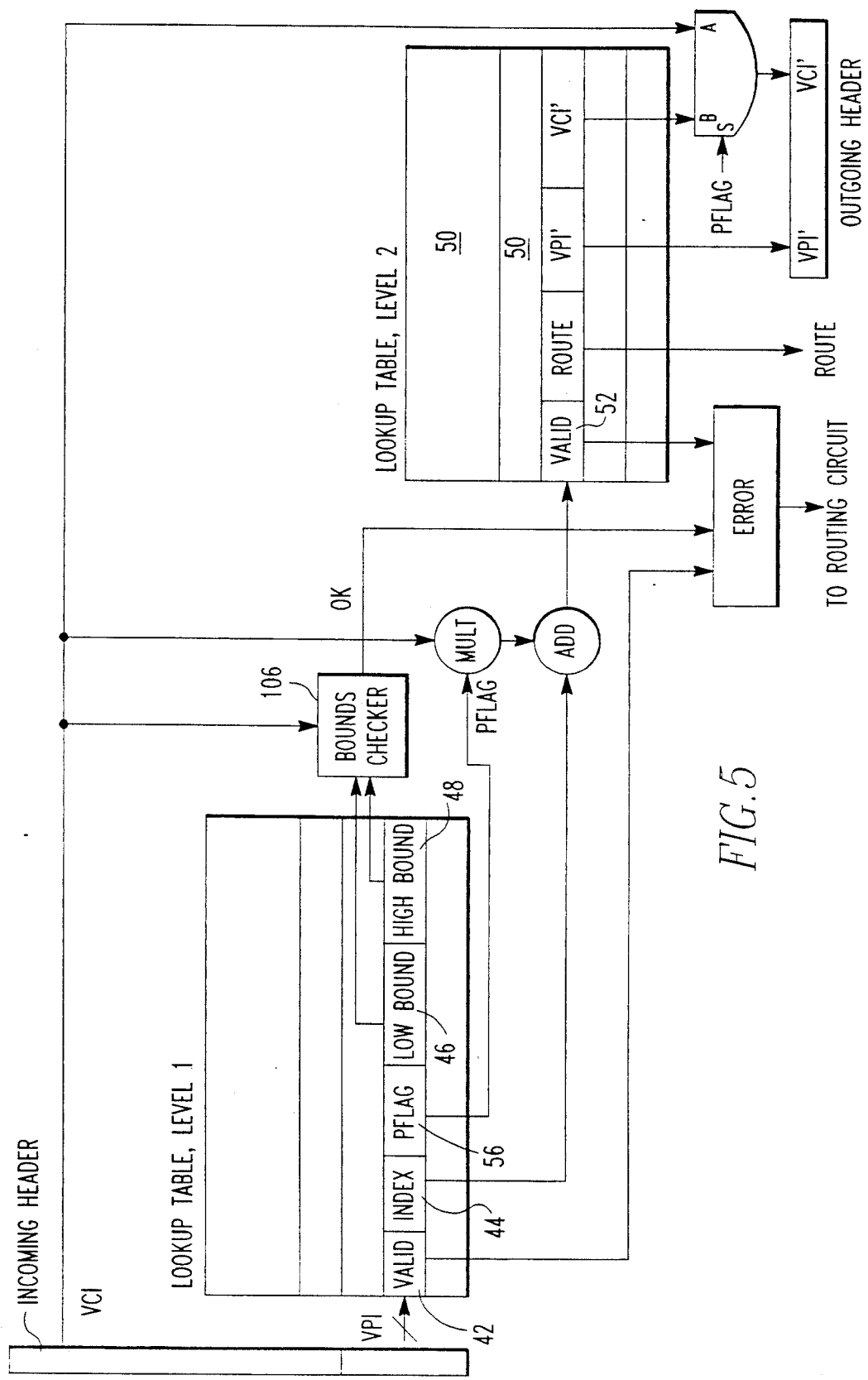
FIG. 5 is a schematic representation of a preferred embodiment of a first table and a second level table of the present invention.

The present invention pertains to an ATM cell interface 14 for dispatching an ATM cell 24 having a header, as shown in FIGS. 3, 4 and 5. The ATM cell interface 14 is comprised of L input ports 26, where L≦1 and is an integer. The interface 14 is also comprised of a table lookup mechanism 30 that directs a cell 24 from an input port 26 to any desired destination. The table lookup mechanism 30 has entries which identify desired destinations for corresponding cells 24. The number of possible entries in the table lookup mechanism 30 is less than a total number of entries supported by the ATM cell header.

Figure 1:
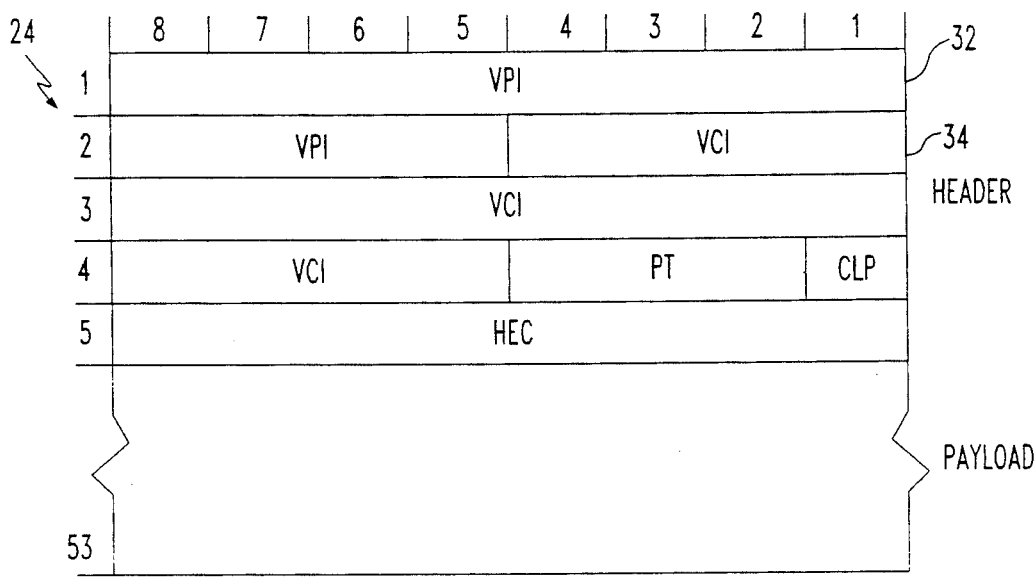
FIG. 1 is a schematic representation of an ATM cell.

The cell 24 preferably includes a VPI field 32, as shown in FIG. 1, having a value and a VCI field 34 having a value. The table lookup mechanism 30 preferably includes a first level table 36 which produces a first signal based on the value of the VPI field 32 and a second level table 38 which produces a second signal based on the value of the VCI field 34. The first and second signals are used to route the cell 24 from an input port 26 to a desired destination. The desired destination can be, for instance, any device which can utilize an ATM cell such as a television, a memory, a processor or a computer interface.

The first level table 36 preferably has N table entries 40 where N≧1 and each table entry 40 has a VALID field 42 which indicates whether the VPI field value of a cell 24 is defined in the first level table 36, as shown in FIG. 4. Each table entry 40 also is comprised of an INDEX field 44, the value of which is used to access the second level table 38. In the table entry 40, there is also a LOW BOUND field 46 having a value and a HIGH BOUND field 48 having a value, the values of each of which define a range of acceptable VCI values for a given VPI value. Each table entry 40 can also have a PFLAG field 56 having a value of which indicates whether a cell 24 that is to be routed from an input port 26 to a desired output port 28 is connected to a terminating or nonterminating connection, as shown in FIG. 5.

The second level table 38 preferably has M connection entries 50 where M≧1 and is an integer. Each connection entry 50 has a VCI VALID field 52 having a value which indicates whether a corresponding connection between an input port 26 and an output port 28 is realizable, and a CONNECTION INFORMATION field 54 having information about how to form a connection between an input port 26 and a desired destination along a desired path.

When multiple input ports 26 are present with respect to a given table lookup mechanism 30, the input ports are multiplexed to the corresponding first level table 36. The first level table 36 preferably has enough table entries to support any ATM cell from any of the multiple input ports 26 connected to it. However, preferably the second level table has common connection entries to various table entries associated with the ATM cells from different input ports. In other words, the second level table has connection entries which are shared by the ATM cells from various input ports connected to the first level table associated with the second level table.

The present invention also pertains to a method for connecting an ATM cell 24 from a first processor 58 to at least a second processor 60. The method comprises the computer implemented steps of producing the ATM cell 24 with a first processor 58 executing instructions for applications other than communications between other processors. Then, there is the step of transmitting the cell 24 over an ATM network portion 12 in communication with the first processor 58. Next, there is the step of receiving the cell 24 at a switch portion 14 in communication with the ATM network portion 12. Then, there is the step of routing the cell 24 with the switch portion 14 to a second processor 60 in communication with the switch portion 14 and the ATM network portion 12. The second processor 60 executes instructions for applications other than communications between the processors. Preferably, the routing step includes the step of routing the cell based on the values of the VPI field and the VCI field.

The present invention pertains to a method for dispatching an ATM cell 24. The method comprises the steps of locating a first table entry 40 in a first level table 36 corresponding to a value of a VPI field 32 of the cell 24. Then there is the step of producing a first signal corresponding to the table entry 40. Next there is the step of locating a connection entry 50 in a second level table 38 corresponding to a value of a VCI field 34 of the cell 24 and the first signal. Then there is the step of producing a second signal corresponding to the connection entry 50. Next there is the step of directing the cell 24 to a desired destination corresponding to the second signal.

Preferably, the step of locating the table entry 40 includes the steps of determining whether there is a corresponding table entry 40 for the VPI value of the cell 24 in the first level table 36. Then there is the step of producing an error signal if there is no corresponding table entry 40 for the cell 24. Preferably, the step of determining whether there is a corresponding table entry 40 includes the step of determining whether a value of a VALID field is present in the first level table 36.

The step of producing the first signal can preferably include the step of producing the first signal corresponding to a value of an INDEX field of the table entry 40. The step of producing the second signal preferably includes the step of producing the second signal corresponding to a value of a CONNECTION INFORMATION field of the connection entry 50.

After the step of locating the table entry 40, there can preferably be the step of determining whether the VCI value of the cell 24 is within a range of allowable values. There can additionally be the step of producing the error signal if the VCI value is not within a range of allowable values. The step of determining whether the VCI value is within an allowable range preferably includes the step of checking whether the VCI value is between a LOW BOUND value of a LOW BOUND field and a HIGH BOUND value of a HIGH BOUND field of the table entry 40.

The step of locating a connection entry 50 can include the steps of determining whether there is an active connection entry 50 corresponding to the VCI value and the INDEX value. Then there is the step of producing the error signal if there is no active connection entry 50. After the step of producing the error signal, there can be preferably the step of discarding the cell 24. The step of determining whether there is an active connection entry 50 preferably includes the steps of determining whether a VALID value in the connection entry 50 is present in the second level table 38. Preferably, the step of producing a second signal includes the step of producing the second signal corresponding to a value of a ROUTE field of the connection entry 50.

After the step of locating the table entry 40, there can be the step of determining whether the cell 24 is provided to a terminating connection or a non-terminating connection. After the step of determining whether the cell is provided to a terminating or non-terminating connection, there is preferably the step of translating the VPI and VCI values of the cell if the cell 24 belongs to a terminating connection.

In the operation of the preferred embodiment, the preferred mechanism developed herein is based on a unique and unobvious two level table lookup mechanism that does not require any bit-stripping in order to support any combination of VPI and VCI in the header field of the cell. The first level table 36 is indexed by the VPI entry and the second level table 38 is indexed by a combination of the first lookup table entry and the VCI field value as shown in FIG. 4. Note that this is simply a conceptual diagram that in practice can be implemented in various ways. As shown in FIG. 4, an incoming cell header is separated into its VCI and VPI fields. A first table 36 referred to as Lookup Table, Level 1 is directly indexed by the VPI field (12 bits) and its size is fixed. The first table entry 40 contains at least the following fields (other fields can be added as described later):

A valid bit VALID field 42 that indicates whether this VPI value is currently supported.

Two 16 bit entries: Lower and Upper bounds 46, 48 that are used to indicate the range of allowable VCI values for a given VPI entry. Valid connections will have incoming VCI values ranging from the lower to the upper bound.

An m—bit INDEX value 44 that is used in conjunction with the incoming VCI to index the second level table. The actual value for m depends on how large the second level table is to be; however in any case will be less than or equal to 28.

In its basic form the second level table 38, referred to up Table, Level 2 is indexed by simply adding the INDEX 44 and the incoming VCI value. The second level table connection entries 50 in its generic form contain the following fields:

A valid bit VALID 52 that indicates whether the connection is valid. Although a range of VCI entries should be reserved in the second level table (corresponding to the range between the low and high bounds specified in the first table) it is still possible to allow only a subset of these to be active at any given time.

CONNECTION INFORMATION field 54; this field is generic and is highly dependent on how it is to be used by the circuitry in which this mechanism is implemented (as shown below). In general, the connection information will contain sufficient information about the state of the connection so that it is possible to determine unambiguously how to route the incoming cell 24. Moreover, it is also possible for this field to be updated as each cell 24 goes through the above described mechanism.

In this mechanism 30, the size of the second level table 38 is directly proportional to how many total connections need to be supported for a given interface and in realistic cases is far less than the range of all possible entries supported by the ATM cell header.

Error cases such as nonvalid entries in the first or second level table or out of bounds incoming VCI are flagged with the ERROR flag 53 and are used to determine whether the incoming cell belonged to an existing and valid connection (that is a connection that has been setup).

End user interfaces typically consume cells 24 as they arrive at the network interface. Each cell 24 is to be dispatched based on its header field to the next layer of the protocol processing. In this case, the basic mechanism described above provides most of the functionality. In practice, the connection information field would contain one of the following:

A pointer to a data structure that will be used by a CPU or other mechanism to index a table where the structure will be located.

The data structure itself; in this case each entry will probably consist of many successive memory locations; this in itself does not affect the basic mechanism described above, it is merely an implementation detail. In this case, the connection information field 54 is likely to be updated each time a cell 24 goes through the lookup mechanism 30.

A high level description of the algorithm (assuming a pointer to a connection structure is returned by table 2) can be laid out as written in Table 1.

ATM switch interfaces are typically different from user interfaces in how they handle incoming cells: The cell header is used to direct the cell through the switch itself; these operations are mostly done in hardware. A switch merely routes a cell from an input port 26 to an output port 28.

TABLE 1

Basic Algorithm for end user network interface

```
index1  = get_VPI_from_header   ; entry point to routine
VCI     = get_VCI_from_header
entry1  = lookup_table1[index]
if valid(entry1)  {                  ; from valid bit field of entry
  if (VCI >= get_low_bound_from_entry1) AND ;
    BOUNDS checking
     (VCI <= get_upper_bound_from_entry1)
  {
     index2 = index(entry1) + VCI   ;  ADDS
     entry2 = lookup_table2[index2]
     if valid(entry2)  { ; from valid bit field of entry2
     pointer = get_pointer_from_entry2;
        return(pointer)     ; returns
        }
     }
  }
return(ERROR)       ; if failed to find valid entry
```

In the ATM standard two basic types of connections can be setup each with its corresponding translation mechanisms:

Non terminating virtual paths connections. In this case only the VPI entry is used for routing lookup;

and the VCI entry is left unchanged as it goes through the switch 20 to, for instance, another switch 21.

Terminating virtual paths connections. In this case both the VPI and VCI entries are used for routing lookup and both entries are translated as they go through the switch 20 to, for instance, the second computer 18.

In order to support a switch interface the basic mechanism can be extended to the one shown in FIG. 5:

Again as in the basic mechanism an incoming cell header is separated into its VCI and VPI fields. First the VPI (12 bits) is used to directly index the first level table (of fixed size). The first level table contains the following fields:

A valid bit VALID 44 that indicates whether this VPI is supported.

A flag bit PFLAG 56 which indicates whether this connection is a terminating connection (PFLAG=1) or a non-terminating connection.

Two 16 bit entries: lower and upper bounds 46, 48 that are used to indicate the range of allowable VCI values for a given VPI entry.

An m-bit INDEX 44 used in conjunction with the incoming VCI to index the second level table.

The second level table 38 is indexed as follows (assuming the first level entry yielded a valid entry): When PFLAG is zero, then the INDEX value is used directly to index the second level table 38 since non-terminating path translations do not depend on the incoming VCI values. When PFLAG is set to one then the INDEX value is ADDED to the value of the VCI yielding an index into the second level table 38. Note that adding is therefore conditional to the value of PFLAG being set to one.

Therefore, a non-terminating path connection will utilize only a single entry in the second level table 38. Moreover, terminating connections for a given VPI will utilize only as many successive entries as the difference between the upper and lower bounds of the VCI. In short, the total amount of possible connections is directly limited by the amount of memory in the second level table 38.

A high level description of the mechanism can be written out as written in Table 2.

TABLE 2

| Basic Algorithm for switch network interface |
|---|
| index1 = get_VPI_from_header ; entry point of routine |
| VCI = get_VCI_from_header |
| entry1 = lookup_table1[index1] |
| PFLAG = get_path_flag_from_entry1 |
| if valid(entry1) { ; from valid bit field of entry1 |
|   if (VCI >= get_low_bound_from_entry1) AND ; BOUNDS checking |
|   (VCI <= get_upper_bound_from_entry1) |
| { ; Adds if PFLAG=1 |
|   if (PFLAG==1) index2 = index(entry1) + VCI |
|   else index2 = index(entry1) |
|   entry2= lookup_table2[index2] |
|   if valid(entry2) { ; from valid bit field of entry2 |
|   pointer = get_pointer_from_entry2; |
|     if (PFLAG==1) VCI' = get_VCI'_from_entry2 |
|     else VCI' = VCI |
|   VPI' = get_VPI'_from_entry2 |
|   VPI' = get_VPI'_from_entry2 |
|   ROUTE = get_route_from_entry2 |
|     return(ROUTE,VPI',VCI') |
|   } |
| } |

TABLE 2-continued

| Basic Algorithm for switch network interface |
|---|
| } |
| return(ERROR) ; if failed to find valid entry |

Extensions to the basic lookup mechanism described for the switch interface (some of them are also applicable to the end user interface) can include:

Cell counters on a per connection entry basis. In this case one more information field is added (or a parallel table entry) that maintains a count on how many cells have successfully gone through the lookup mechanism on a per connection basis. These counters are very useful for monitoring as well as connection management.

Bandwidth Enforcement. In this case, only a certain amount of cells 24 per connection will be allowed to go through the mechanism during a predetermined time period. To implement this another cell 24 counter similar to the one described above is added. However the counters get periodically preloaded with predetermined cell allocation counts (each connection with its own allocation count) and then start decrementing as cells go through the lookup circuitry. Cells for a given connection are accepted unless its allocation counter has reached zero.

It is often the case that multiple input ports 26 can be time multiplexed before they reach the routing circuitry of the switch. In this case, the two level lookup mechanism is extended for the switch interface as follows:

The first level table lookup can be extended by adding addressing bits that are used to indicate which port s indexing the table. Each port has therefore a dedicated range of entries in the first level table 36 in the same range as in the non-multiplexed case. Thus, the size of the first level table 36 in the case of multiplexed ports is proportional to the number of ports that are multiplexed through the lookup circuitry.

The second level table 38 remains unchanged since at this level it is independent of the source of the connection.

This multiplexed implementation offers the following advantages over distributed tables (that is individual tables for each port):

Although the first level table is proportional to the number of ports multiplexed; the second level table need not necessarily grow up linearly; rather it size will dictate the maximum total number of connections that can be accepted at any given time. Multiple ports draw from a common pool of entries and can therefore use entries from ports that are less busy.

More cost effective since the lookup mechanism is shared among multiple ports.

There are many practical ways to implement any of the above mechanisms. First it is conceivable to implement them efficiently in software. As shown in Tables 1 and 2, only a few simple instructions (two memory references, one add and some field extraction) are required. Moreover, both tables can actually be part of the main memory attached to the CPU.

Hardware implementations of the mechanisms require very few off the shelf hardware components:

Memories: Static and dynamic memories can be used. The two tables can be merged if pipelining of the algorithm is not required for speed reasons.

Bound comparators (16 bits) and adders (at most 28 bits).

Some simple decision logic to detect errors.

Other components such as registers, cell counters and so on.

Figure 7:
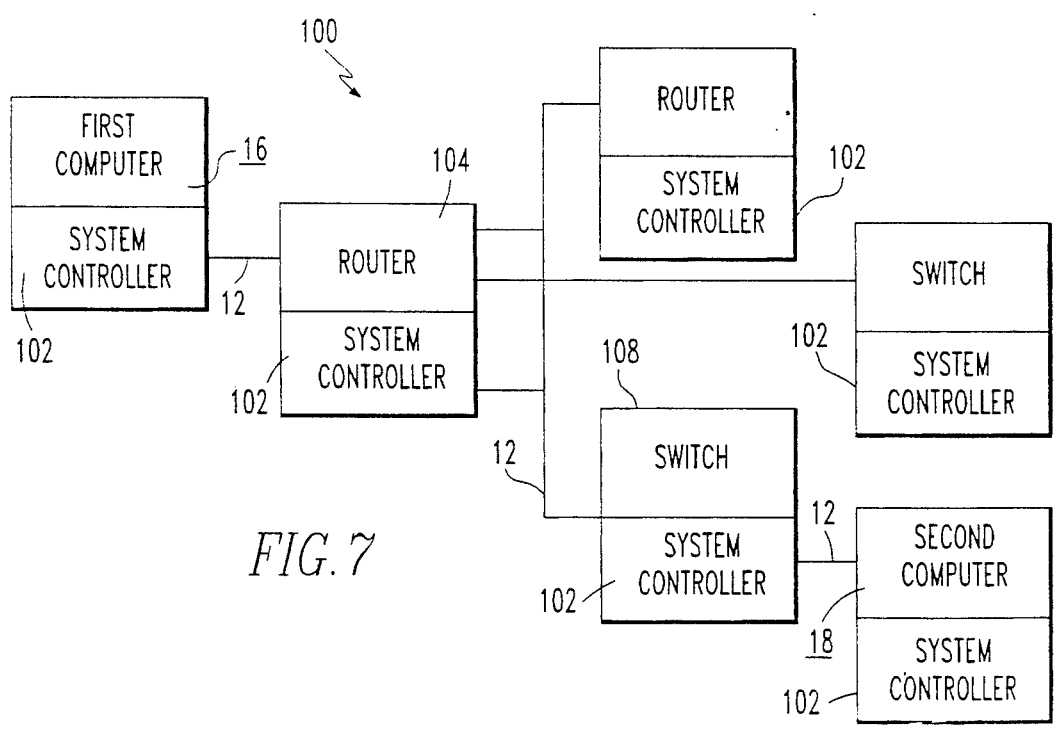
FIG. 7 is a schematic representation of ATM communication network.

For exemplary purposes, a description of how a cell is dispatched by the preferred embodiment of the invention will now be described. Referring to FIG. 7, there is shown a schematic representation of a communication network 100. The network 100 is comprised of a first computer 16 and at least a second computer 18. The second computer 18 is in communication with the first computer 16 through ATM transmission lines 12. The network 100 is also comprised of at least one router 104 and at least one switch 108 which direct ATM cells produced by the computers to desired destinations. The overall operation of the network 100 is governed by system controllers 102, such as those by Sun Microsystems, Inc., in communication with all the computers, switches, routers, etc. of the network 100.

When the first computer 16 desires to send an ATM cell to the second computer 18, the value of the VPI field and the value of the VCI field of the cell is determined by at least some of the system controllers 102 in the network 100. The system controllers 102 accomplish this by the necessary ones communicating with each other with respect to the connectivity of the network 100 a nd identifying a path for the ATM cell to follow from the first computer 16 to the second computer 18. The controllers 102 then create entries in their respective first level and second level tables in the desired switches, routers, etc. of the network 100 so the cell can travel from the first computer 16 to the second computer 18.

Specifically, the controller 102 of the first computer 16 communicates with the controller 102 of the router 104 which communicates with the controller 102 of the switch 108 which communication with the controller 102 of the second computer 18. Through their respective controllers 102, the second computer 18 informs the switch 108 which informs the router 104 which informs the first computer 16 of the necessary respective VPI and VCI information for the ATM cell's proper header creation in the first computer 16, and for respective entries in the respective first and second level tables. Moreover, the additional information to complete the respective entry fields are also provided in this way.

For instance, the controllers 102 identify the router 104 as a first destination for the cell to travel from the first computer 16 to the second computer 18. The system controller 102 in the router 104 identifies or creates a first table entry 40 in the first level table 36 and creates a connection entry 50 in the second level table 38 of the router 104. The system controller 102 of the router 104 then provides VPI and VCI information to the first computer 16 for the ATM cell corresponding to its first table entry 40 and connection entry 50 in the first table 36 and second table 38, respectively, of the router 104. This is essentially repeated between the router 104 and the switch 108, and the switch 108 and the second computer 18.

The first computer 16 then transmits the ATM cell along the transmission lines 12 to the router 104 where it is received by router 104 and put in a queue therein.

At the proper time, the router 104 then determines if the VPI value of the cell is supported in the first level table 36 by reviewing the VALID values of the first table entry 40. If there is no first table entry 40 associated with the cell, then an error signal is produced causing the cell to be eliminated.

Once the VPI value of the cell is deemed to be supported, then the INDEX value of the associated first table entry 40 is provided to the second level table 38 of the router 104. At essentially the same time, a LOW BOUND value and a HIGH BOUND value of the first table entry 40 are provided to a bounds checker 106, as shown in FIG. 5. The VCI value of the cell is also provided to the bounds checker 106 which, with the LOW BOUND and HIGH BOUND values determines whether there is a connection entry 50 supported in the second level table 38 for the VCI value of the cell. If the VCI value is not supported, the error signal is produced and the ATM cell is eliminated.

Once the VCI value of the cell is determined by the bounds checker to be supported, a PFLAG value of the first table entry 40 is multiplied by the VCI value of the cell. Since a non-terminating connection follows from router 104 in this instance, the PFLAG value is zero, causing the multiplication with the VCI value to be zero. The resulting multiplication value (zero in this instance) is added to the INDEX value of first table entry 40. The resulting addition value is used to identify a connection entry 50 in the second table 38 associated with the cell.

A ROUTE value of the connection entry 50 associated with the cell is used to direct the cell onto its next destination, and the VPI value of the cell is translated to the appropriate new VPI value for the next destination in the network 100 along the path of the cell. It should be noted that since the PFLAG value in this instance indicated that the resulting connection with the next destination is a non-terminating connection, the same VCI value is provided to the cell as it is transmitted to its next destination. The ROUTE value as well as the new VPI value has been previously provided to the connection entry 50 when it was created by the system controller 102 of the router 104 based on the next destination determined for the cell. In this case, the next destination is a switch 108.

As described above for the router, the system controller 102 of the switch 108 has identified or created a first table entry 40 in the switch 108 associated with the VPI value of the cell, and has also created a connection entry 50 with the necessary information for the furtherance of the cell to its ultimate destination. The cell having been transmitted from router 104 to switch 108 based on the ROUTE value identified in the connection entry 50 of the second table 38 in the router 104 is received by switch 108 where essentially the same procedure as described above for the router 104 is performed to identify an associated connection entry 50 and thus connection information. However, in this case, since a terminating connection results with the switch 108 when the cell is transmitted for the switch 108, the PFLAG value of the first table entry 40 is one. When the PFLAG value of one is multiplied by the VCI value of the cell, a value other than 0 is added to the INDEX value of the first table entry 40 of the first table 36 of the switch 108. The resulting addition value comprised of the INDEX value and the VCI value is used to identify the corresponding connection entry 50 in the second table 38.

The VCI value of the cell is first checked to see if an active connection is associated therewith. This is accomplished by reviewing the VALID values of the connection entries 50 in the second level table 38 and determining whether there is an associated connection entry 50 for the VCI value of the cell. If there is no such connection, the error signal is produced and the ATM cell is eliminated.

The corresponding valid connection entry 50 has a ROUTE value necessary to form a connection between the switch 108 and a second computer 18, the ultimate destination for the cell. The connection entry 50 also has a new VPI value and VCI value that has been identified earlier by the system controller 102 of the switch 108 to correspond to the second computer 18 such that the second computer 18 can properly receive the cell. When the cell is transmitted by the switch 108, it is dispatched to the second computer 18 whereby according to the new VPI and VCI values of the cell it is properly received by the second computer 18.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for dispatching an ATM cell comprising the steps of:
   locating a table entry in a first level table corresponding to a value of a VPI field of the cell;
   producing a first signal corresponding to the table entry;
   locating a connection entry in a second level table corresponding to a value of a VCI field of the cell and the first signal;
   producing a second signal corresponding to the connection entry; and
   directing the cell to a desired destination corresponding to the second signal.

2. A method as described in claim 1 wherein the locating a table entry step includes the step of determining whether there is a corresponding table entry for the VPI value of the cell in the first level table; and producing an error signal if there is no corresponding table entry for the cell.

3. A method as described in claim 2 wherein the step of producing the first signal includes the step of producing the first signal corresponding to a value of an INDEX field of the table entry.

4. A method as described in claim 3 wherein the step of producing the second signal includes the step of producing the second signal corresponding to a value of a CONNECTION INFORMATION field of the connection entry.

5. A method as described in claim 4 including after the step of locating the table entry, the step of determining whether the VCI value is within a range of allowable values, and producing the error signal if the VCI value is not within a range of allowable values.

6. A method as described in claim 5 wherein the locating a connection entry step includes the steps of determining whether there is an active connection entry corresponding to the value of the VCI value and the INDEX value; and producing the error signal if there is no active connection entry.

7. A method as described in claim 6 including after the step of producing the error signal, the step of discarding the cell.

8. A method as described in claim 7 including after the step of locating the table entry, the step of determining whether the cell is provided to a terminating connection or a non-terminating connection.

9. A method as described in claim 8 including after the step of determining whether the cell is provided to a terminating or non-terminating connection, the step of translating the VPI and VCI values of the cell if the cell is provided to the terminating connection.

10. A method as described in claim 9 wherein the step of determining whether the VCI value is within an allowable range includes the step of checking whether the VCI value is between a LOW BOUND value of a LOW BOUND field and a HIGH BOUND value of a HIGH BOUND field of the table level entry.

11. A method as described in claim 10 wherein the step of determining whether there is a corresponding table entry includes the step of determining whether a value of a VALID field is present in the first table.

12. A method as described in claim 11 wherein the step of determining whether there is an active connection entry includes the step of determining whether a value of a VALID field in the connection entry is present in the second level table.

13. A method as described in claim 12 wherein the step of producing a second signal includes the step of producing the second signal corresponding to a value of a ROUTE field of the connection entry.

14. An ATM cell interface for dispatching ATM cells, each ATM cell having a header with a VPI field having a value and a VCI field having a value, comprising:
   L input ports through which ATM cells enter the interface, where $L \geq 1$ and is an integer;
   P output ports through which ATM cells exit the interface, where $P \geq 1$ and is an integer; and
   a table lookup mechanism that directs the ATM cells from an input port of the L input ports to any desired destinations through at least one output port of the P output ports, said table lookup mechanism having entries which identify desired destinations for corresponding ATM cells, the number of possible entries in the table lookup mechanism being less than a total number of entries supported by the ATM cell header, said table lookup mechanism producing a first signal based on the value of the VPI field and a second signal based on the value of the VCI field for each of the ATM cells which are used to route each of the ATM cells from an input port to a desired destination through at least one output port of the P output ports.

15. An ATM cells interface as described in claim 14 wherein the table lookup mechanism includes a first level table which produces the first signal based on the value of the VPI field and a second level table which produces the second signal based on the value of the VCI field for each of the ATM cells, said first and second signals being used to route each of the ATM cells from an input port of the L input ports to the desired destinations through at least one output port of the P output ports.

16. An ATM cell interface as described in claim 15 wherein the first level table has N table entries, where N24 1, and wherein the second level table entry has M connection entries where $M \geq 1$ and is in integer.

17. An ATM cell interface as described in claim 16 wherein each first level table entry has a VALID field which indicates whether the VPI field of a cell is defined in the first level table, and each first level table entry has an INDEX field the value of which is used to identify a corresponding connection entry in the second level table.

18. An ATM cell interface as described in claim 17 wherein the first level table entry includes a VCI INFORMATION FIELD a value of which identifies whether the VCI value of the cell is supported in the second level table.

19. An ATM cell interface as described in claim 18 wherein the INFORMATION FIELD includes a low bound field having a value and a high bound field having a value, the values of the low bound and low bound field define a range of acceptable VCI values for a given VPI value.

20. An ATM cell interface as described in claim 19 wherein each connection entry has a VCI VALID field having a value which indicates whether a corresponding connection between an input port and one of the any destinations through at least one input port of the P output ports is realizable, and a CONNECTION INFORMATION field having information about how to form a connection between an input port of the L input ports and a desired destination through at least one output port of the P output ports to direct the cell along a desired path.

21. An ATM cell interface as described in claim 20 wherein each first table entry also has a PFLAG field having a value of which indicates whether an ATM cell that is to be routed from an input port of the L input ports to a desired one of the any destinations through at least one output port of the P output ports travels along a terminating or nonterminating connection.

22. An ATM cell interface as described in claim 21 wherein each CONNECTION INFORMATION field includes a ROUTE field value of which is used to direct the cell.

23. An ATM cell interface as described in claim 22 wherein each CONNECTION INFORMATION field includes a new VPI field and a new VCI field, a value of the new VPI field and the new VCI field can be used to translate the VPI value and VCI value of the cell, respectively.

24. A method of connecting an ATM cell with a VPI field having a value and a VCI field having a value, from a first processor to a second processor comprising the steps of:
producing the ATM cell with the first processor;
transmitting the cell over an ATM network portion in communication with the first processor;
receiving the cell at a switch portion in communication with the ATM network portion;
producing a first signal based on the value of the VPI field and a second signal based on the value of the VCI field; and
routing the cell with the switch portion based on the first signal and the second signal to the second processor in communication with the switch portion and the ATM network portion.

25. An ATM cell interface for dispatching an ATM cell comprising:
L input ports, where $L \geq 1$ and is an integer;
P output ports, where $P \geq 1$ and is an integer;
a first level table having a plurality of table entries which support the ATM cell received from any of the L input ports, said L input ports connected to the first level table such that the L input ports are multiplexed to the first level table; and
a second level table having a plurality of connection entries, said second level table in connection with said first level table, at least one connection entry shared by at least two table entries of the first level table, and said second level table in connection with said P output ports through which the ATM cell exits by way of at least one of the P output ports.

26. An ATM cell interface for dispatching ATM cells, each ATM cell having a header with a VPI field having a value and a VCI field having a value, comprising:
L input ports through which ATM cells enter the interface, where $L \geq 1$ and is an integer;
P output ports through which ATM cells exit the interface, where $P \geq 1$ and is an integer; and
a table lookup mechanism that directs the ATM cells from an input port of the L input ports to any desired destinations through at least one desired output port of the P output ports, said table lookup mechanism having entries which identify desired destinations for corresponding ATM cells, the number of possible entries in the table lookup mechanism being less than a total number of entries supported by the ATM cell header, said table lookup mechanism identifying whether the desired destination is reached by the cell along a terminating or a nonterminating path.

27. An ATM cell interface for dispatching ATM cells, each ATM cell having a header comprising:
L input ports through which ATM cells enter the interface, where $L \geq 1$ and is an integer;
P output ports through which ATM cells exit the interface, where $P \geq 1$ and is an integer; and
a table lookup mechanism that directs the ATM cells from an input port of the L input ports to any desired destinations through at leas tone desired output port of the P output ports, said table lookup mechanism having entries which identify desired destinations for corresponding ATM cells, the number of possible entries in the table lookup mechanism being less than a total number of entries supported by the ATM cell header, said table lookup mechanism supporting any combination of VPI and VCI values without bit stripping the cell.

* * * * *

UNITED STATES PATENT AND TRADEMARK OFFICE
CERTIFICATE OF CORRECTION

PATENT NO. : 5,323,389
DATED : June 21, 1994
INVENTOR(S) : Francois J. Bitz, et. al.

It is certified that error appears in the above-indentified patent and that said Letters Patent is hereby corrected as shown below:

Drawings:

Figure 3, change "33" to -- 38 -- .
Column 1, line 65, change "$\leq$" to -- $\geq$ -- .
Column 2, line 64, change "switch portion" to -- cell interface -- .
Column 3, line 7, change "$\leq$" to -- $\geq$ -- .
Column 3, line 8, change "$\leq$" to -- $\geq$ -- .
Column 3, line 20, change "$\leq$" to -- $\geq$ -- .
Column 4, line 19, change "switch portion" to -- cell interface -- .
Column 4, line 22, change "switch portion" to -- cell interface -- .
Column 4, line 23, change "switch portion" to -- cell interface -- .
Column 5, line 56, change "up" to -- as Lookup -- .
Column 7, line 16, change "44" to -- 42 -- .
Column 8, line 52, change "it" -- its -- .
Column 9, line 31, change "a nd" to -- and -- .
Column 12, line 55, change "cells" to -- cell -- .
Column 12, line 67, change "N24 1" to -- $N \geq 1$ -- .

Signed and Sealed this

Fourteenth Day of January, 1997

Attest:

BRUCE LEHMAN

Attesting Officer

Commissioner of Patents and Trademarks